July 27, 1965  J. R. STEINLE  3,196,572
FISHING ROD
Filed Nov. 24, 1961

INVENTOR
JAMES R. STEINLE
BY Beale and Jones
ATTORNEYS

United States Patent Office 3,196,572
Patented July 27, 1965

3,196,572
FISHING ROD
James R. Steinle, 800 N. Broadway, Greenville, Ohio
Filed Nov. 24, 1961, Ser. No. 154,750
2 Claims. (Cl. 43—22)

This invention relates to fishing rods and more particularly to a reel mount for a fishing rod used with bait casting rods.

Reel mounts have been provided for bait casting rods in which the mount is downwardly offset from the inner end of the rod, and so constructed that the line leading from the reel will be below the fishing rod so it will easily feed through the guide eyes on the underside of the rod. A reel mount of this nature confines the line between the reel and the first guide eye on the rod making it difficult to play or manipulate the line during the casting operation. It is desirable when casting to be able to grasp the line between the reel and the guide eyes to play it to one side for better control of the fishing line.

Accordingly, it is the principal object of this invention to provide a downwardly offset reel mount of the type described which will permit the line to be freely played to one side of the mount.

It is a further object of this invention to provide a reel mount of this nature which can be constructed using a minimum of parts.

It is a still further object of this invention to provide a reel mount which is compact in structure, strong and reliable in use, and relatively inexpensive to manufacture.

These and other objects and advantages of the invention will become apparent from the following specification and drawing wherein like numerals refer to similar parts throughout.

Basically, the reel mount of this invention includes a one-piece frame member having a seat portion terminating in a hand grip and a forwardly and upwardly extending arcuate arm portion having a socket adapted to receive a fishing rod. The single arcuate arm permits the line to run unobstructed from the reel to the guide eyes on the rod, and it permits the line to be played to one side of the mount during the casting operation. The frame also includes fixed and movable jaws for detachably securing a reel in place.

Figure 1:
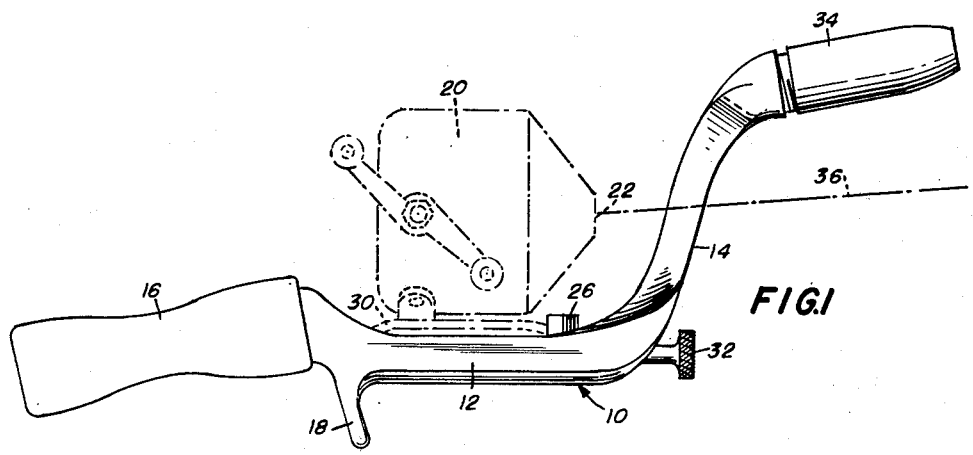
FIGURE 1 is a side elevation of the reel mount of this invention.
Figure 2:
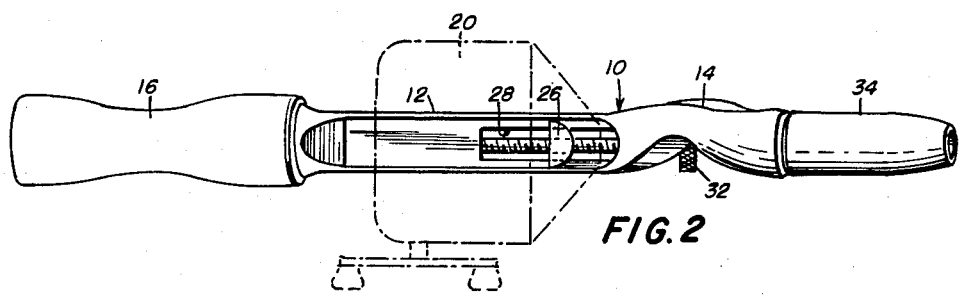
FIGURE 2 is a top plan view thereof.
Figure 4:
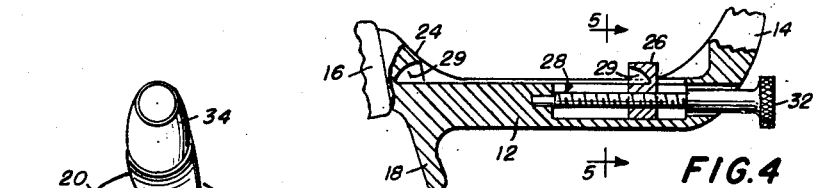
FIGURE 4 is a section taken along the line 4—4 of FIGURE 3.

Referring to the drawing it will be seen that the reel mount includes a one-piece frame member, generally designated 10, having a seat portion 12 and an upwardly and forwardly extending arm portion 14. The rear end of the seat portion 12 has means for engaging a hand-grip 16, and the seat portion 12 has an integral trigger-like member 18 for receiving a person's finger. A reel 20 (shown in phantom lines) having a forwardly and centrally disposed fairlead or line guide 22 is adapted to be releasably attached to the seat portion 12 of the frame 10. As best shown in FIGURE 4, a fixed jaw 24 and jaw 26 slidable in a slot 28 are provided to receive in their cavities 29 the respective ends of an elongated base plate 30 of the reel 20. The jaw 26 may be adjusted to fit different size reels by rotation of the bolt 32 threadably engageable with the jaw 26.

Figure 3:
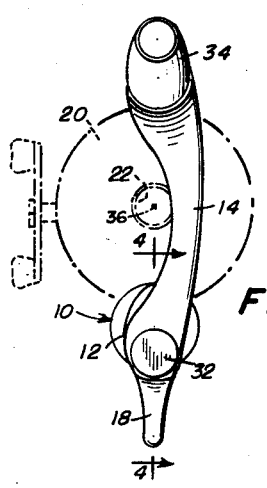
FIGURE 3 is a front elevation of the reel mount.
Figure 5:
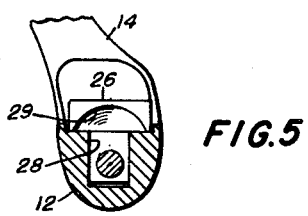
FIGURE 5 is a section taken along the line 5—5 of FIGURE 4.

The front end of the arm 14 has a fishing rod receiving socket 34 mounted thereon. The central axis of the socket 34 is generally parallel to a longitudinal axis of the seat portion 12. By referring to FIGURE 3, it will be observed that the socket 34 is vertically spaced above the seat portion 12 and lies in a plane containing the seat portion 12 and the line guide 22. The arm portion 14 connecting the socket 34 with the seat portion is arcuate allowing its mid-part to be laterally offset from one side of the mount. This construction permits the line 36 to extend unobstructed between the line guide 22 and the guide eyes on the fishing rod.

The hand grip 16 is held in a person's left hand. It will be readily apparent that the user may grasp the line between the reel and the first guide eye on the rod and freely manipulate the line playing it to the right side of the mount as much as desired. This construction permits the user to exercise much more control over the line than is possible with other reel mounts of this nature.

Thus it can be seen that I have provided a novel reel mount for a bait casting rod which will permit the reel to be mounted below the fishing rod so the line will easily feed between the reel and the guide eyes, and by this novel construction the line may be easily played to one side during the casting operation. The reel shown for purposes of illustration of the invention is intended for use by a right-handed person. Obviously, it is within the scope of the invention to provide the opposite hand construction of the reel mount allowing it to be used by a left-handed person. The reel mount may also be used with any conventional reel.

While this invention has been shown in but a limited number of forms, it is obvious to those skilled in the art that it is not so limited, but is susceptible of various changes and modifications without departing from the spirit and claims of the invention.

I claim:

1. A reel mount for a fishing rod comprising a frame having a rearward seat portion terminating in a hand grip and a forwardly and upwardly extending arm portion, fishing rod receiving means on the front end of said arm portion, attaching means on said seat portion for releasably engaging a fishing reel, a fishing line extending from a reel on said seat portion to the underside of a rod in said rod receiving means, said arm portion having its mid-part laterally offset to only one side of said mount and said line, said line having its other side unobstructed by said mount so that it may be displaced laterally away from said arm portion to a side of said mount.

2. A reel mount for a fishing rod comprising a frame having a rearward seat portion and a forwardly and upwardly extending arm portion, means at the rear end of said seat portion for engaging a hand grip, a fishing rod receiving socket on the front end of said arm portion having its central axis generally parallel to a longitudinal axis of said seat portion, attaching means on said seat portion for releasably engaging a fishing reel, a fishing line extending from a reel in said attaching means to the underside of a rod in said rod receiving means, said arm portion having its mid-part laterally offset to only one side of said mount and said line, said line having its other side unobstructed by said mount so that it may be displaced laterally away from said arm portion to a side of said mount.

References Cited by the Examiner

UNITED STATES PATENTS

| | | | |
|---|---|---|---|
| 1,833,787 | 11/31 | Mauss | 43—25 |
| 1,962,869 | 6/34 | Heddon | 43—23 X |
| 2,294,052 | 8/42 | Springer | 124—24 |
| 2,503,510 | 4/50 | Rives | 43—22 |
| 2,655,756 | 10/53 | Polis | 43—23 |

FOREIGN PATENTS 45,999 11/35 France
(1st addition of 775,766).

OTHER REFERENCES

Popular Mechanics, June 1948, page 154.

ABRAHAM G. STONE, *Primary Examiner.*